(12) United States Patent
Aggarwal et al.

(10) Patent No.: US 12,190,366 B2
(45) Date of Patent: Jan. 7, 2025

(54) SYSTEMS AND METHODS FOR PRODUCT SEARCH USING GENERATED SHAPE DESCRIPTORS AND EDGE IMAGE OF SOURCE PRODUCT IMAGES

(71) Applicant: Adobe Inc., San Jose, CA (US)

(72) Inventors: Rishu Aggarwal, Rohini (IN); Sunil Rawat, Faridabad (IN); Ajay Bedi, Hamirpur (IN)

(73) Assignee: Adobe Inc., San Jose, CA (US)

(*) Notice: Subject to any disclaimer, the term of this patent is extended or adjusted under 35 U.S.C. 154(b) by 72 days.

(21) Appl. No.: 18/164,958

(22) Filed: Feb. 6, 2023

(65) Prior Publication Data
US 2023/0177580 A1   Jun. 8, 2023

Related U.S. Application Data

(62) Division of application No. 16/775,909, filed on Jan. 29, 2020, now Pat. No. 11,593,858.

(51) Int. Cl.
| | | |
|---|---|---|
| G06Q 30/0601 | (2023.01) | |
| G06T 7/12 | (2017.01) | |
| G06T 7/13 | (2017.01) | |
| G06V 10/20 | (2022.01) | |
| G06V 10/25 | (2022.01) | |
| G06V 10/46 | (2022.01) | |

(52) U.S. Cl.
CPC ..... *G06Q 30/0627* (2013.01); *G06Q 30/0643* (2013.01); *G06T 7/12* (2017.01); *G06T 7/13* (2017.01); *G06V 10/25* (2022.01); *G06V 10/255* (2022.01); *G06V 10/462* (2022.01)

(58) Field of Classification Search
CPC ............ G06Q 30/0627; G06Q 30/0643; G06T 7/12; G06T 7/13
See application file for complete search history.

(56) References Cited

U.S. PATENT DOCUMENTS

| | | | |
|---|---|---|---|
| 9,280,563 B2 * | 3/2016 | Chittar | ................. G06F 16/50 |
| 10,083,542 B1 * | 9/2018 | Murao | .................. G06T 17/00 |
| 11,593,858 B2 | 2/2023 | Aggarwal et al. | |
| 2009/0067746 A1 | 3/2009 | Monga | |
| 2009/0310861 A1 | 12/2009 | Lang et al. | |

(Continued)

OTHER PUBLICATIONS

"Restriction Requirement", U.S. Appl. No. 16/775,909, filed Feb. 2, 2022, 6 pages.

(Continued)

*Primary Examiner* — Michael Misiaszek
(74) *Attorney, Agent, or Firm* — FIG. 1 Patents (57) ABSTRACT

Systems and techniques for a design-aware image search are described. The design-aware image search techniques described herein capture a design on an item to determine additional items with similar or matching designs. An image of the item is used to create an edge image of a design, and shape descriptors are generated describing features of the edge image. These shape descriptors are compared to shape descriptors associated with other images to locate images that have similar or matching designs as compared with the input image. The design-aware image search system may use these relationships to generate a search result with images or products having a design similar to the design on the input image.

20 Claims, 7 Drawing Sheets

(56) References Cited

U.S. PATENT DOCUMENTS

| | | | |
|---|---|---|---|
| 2013/0010100 A1* | 1/2013 | Kotaki | H01L 22/12 |
| | | | 348/80 |
| 2014/0052584 A1* | 2/2014 | Gershon | G09G 5/06 |
| | | | 705/26.63 |
| 2016/0155018 A1* | 6/2016 | Sakai | G06F 16/5838 |
| | | | 382/197 |
| 2017/0140446 A1 | 5/2017 | Melcher et al. | |
| 2018/0081877 A1* | 3/2018 | Bagropoulos | G06V 10/56 |

OTHER PUBLICATIONS

U.S. Appl. No. 16/775,909, filed Nov. 1, 2022 , "Notice of Allowance", U.S. Appl. No. 16/775,909, filed Nov. 1, 2022, 6 pages.

U.S. Appl. No. 16/775,909, filed May 26, 2022 , "Pre-Interview First Office Action", U.S. Appl. No. 16/775,909, filed May 26, 2022, 3 pages.

Chu, Chih-Hsing , et al., "Cognitive Shape Similarity Assessment for 3D Part Search", Journal of Intelligent Manufacturing 28 [retrieved Nov. 2, 2022]. Retrieved from the Internet <https://doi.org/10.1007/s10845-016-1211-4>, Mar. 24, 2016, 17 pages.

Hu, Yuping , et al., "The Application of Similar Image Retrieval in Electronic Commerce", The Scientific World Journal, vol. 2014 [retrieved Nov. 2, 2022]. Retrieved from the Internet <https://doi.org/10.1155/2014/579401>, Apr. 22, 2014, 7 pages.

* cited by examiner

SYSTEMS AND METHODS FOR PRODUCT SEARCH USING GENERATED SHAPE DESCRIPTORS AND EDGE IMAGE OF SOURCE PRODUCT IMAGES

CLAIM OF PRIORITY

This application is a divisional of and claims priority to U.S. patent application Ser. No. 16/775,909, filed 29 Jan. 2020 and entitled "Design-Aware Image Search," the entire disclosure of which is hereby incorporated by reference herein in its entirety.

BACKGROUND

Some image searching platforms allow users to provide an image as a search input to search for similar images or features related to the image. These search platforms are popular because search input images can be easily captured using a mobile device such as a smartphone. For example, a user may admire a co-worker's new shoes and the user may capture an image (e.g., take a picture) of the coworker's shoes and use the image to identify and purchase the same shoes. Because of this popularity, many online retailers offer a search by image service for their products.

Generally, search platforms will use all of the objects depicted in a search input image, even though only one object may be of interest to the user. Further, a user may not even be interested in an object depicted in the search input image, but may instead be interested in a design included on an object. As a result, many searches based on input images do not return desired or expected results. For example, if the user admired the design on the co-worker's new shoes and captured an image depicting the shoes for use as a search input, then the captured image would likely include other objects such as ankles, pants, flooring, and so forth. In this example, the other objects are noise in the captured image which makes it very unlikely that the search platform will successfully return results related to the shoes. Further, the user is not interested in the shoes themselves, but is instead interested in the design included on the shoes, and thus the shoes themselves are noise in the captured image which makes it very unlikely that the search platform will successfully return results related to the design of interest.

Some conventional systems for performing an image search with an input image allow a user to zoom-in on objects in order to focus the search on an object of interest. However, such conventional systems focus the search on an object and do not allow a user to focus the search on a design without regard for the object it is located on. This further reduces the likelihood that a search using an input image will return results related to the design of interest, resulting in an overall poor user experience.

SUMMARY

Systems and techniques for a design-aware image search are described. These techniques overcome the limitations of conventional image search systems which are limited to searches where information is known about a particular item being searched for, such as a name, description, or image, and cannot accommodate search requests on the basis of design or patterns. To do so, the design-aware image search techniques described herein capture a design on a first item to determine additional different items with similar or matching designs. An image of the first item is used to create an edge image of a design, and shape descriptors are generated describing features of the edge image. These shape descriptors are compared to shape descriptors associated with other images to locate images that have similar or matching designs as compared with the input image. The design-aware image search system exploits these relationships to identify different products for inclusion in a search result.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Conventionally configured image search systems include tools for searching with an input image, e.g., a digital image. For example, some conventional systems allow a user to input a particular image for use in identifying the same particular image within a network or database. Other conventional systems allow a user to input a particular image for use in locating a product visually depicted within the particular image. For instance, a user may use an input image depicting Van Gogh's 'Starry Night' in order to locate additional depictions of Van Gogh's 'Starry Night', or a user may use an input image depicting a specific product in order to locate additional depictions of the particular product.

Consumers often utilize such image search systems to identify a product from an image. For example, a user may have seen a pair of shoes that they are interested in purchasing, and use a picture of the shoes to locate the product on an e-commerce platform. However, the image search processes used by conventional systems are limited in functionality to searches for a product that is included within the input image, and fail to allow a user to perform searches for designs or patterns within an input image. As an example, a user may already own a pair of shoes with a particular pattern, and wishes to locate additional products with the same or similar pattern. Conventional image search systems may identify the pair of shoes in an input image and return results pertaining to the shoes, but cannot locate or identify additional products that are not shoes. As a result, conventional image search systems fail to return desires results, and result in a poor user experience.

Accordingly, since conventional image search systems are unable to provide image searches on the basis of a design or pattern within an object without also searching for the object, users of conventional image search systems are forced to manually search and filter through thousands or millions of possible images, hoping to find a desired result through sheer luck and consuming a great deal of the user's time in addition to wasting resources of a computing device implementing the conventional image search system. Thus, conventional image search systems not only present a suboptimal user experience for image searches, but also result in reduced device and network performance due to inefficient manual filtering procedures.

To overcome these problems, design-aware image search systems and techniques are described in which an image search system leverages designs or patterns in an input image to locate images or products incorporating a similar or matching design or pattern. Consider an example in which a user is interested in a pattern or design on a dress by a model at a fashion show, and the user captures an image of the model wearing the dress with a camera of the user's smartphone. However, the user is not interested in the particular dress worn by the model, and instead is interested only in the pattern on the dress. In this example, the user wants to locate other images or products that incorporate the pattern, and provides the captured image as a search input to an image search service. As used herein, the term "image search service" refers to a searching platform capable of performing searches based on search input images.

The image search service receives the input image and conducts a search based on the input image. The input image depicts not only the pattern or design on the dress, but also depicts the dress itself. The dress itself is noise and its inclusion in the input image causes a conventional image search service to fail to return results related to the design of image to the user, resulting in a negative user experience. The design-aware image search systems and techniques described herein leverages the pattern on the dress in the input image to locate other images or products (that are not the dress in the input image) that incorporate or include a matching or similar pattern.

To do so, the design-aware image search systems and techniques receive captured image data of a scene that includes a design. In one example, the search input system may receive the captured image data in the form of an image, e.g., an image captured by a camera of a user's smartphone. In another example, the system receives the image data from an image capture device of the computing device which may be raw or minimally processes image data.

The system processes the image data to detect a design included on in the image data. For example, the system may process the image data to create an edge image of the design, and generate shape descriptors describing features of the edge image. For instance, an edge map is created with lines and points representing edges for each of a plurality of portions of the image data, and the plurality of edge maps are reconstituted as a single edge map for the image data.

Feature detection techniques are applied to represent the edges of the edge image in a point neighborhood as a collection of small features, such as collections of pixels associated with a location in the edge image. These shape descriptors are compared to shape descriptors associated with other images to locate images that have similar or matching designs as compared with the input image. For instance, the system employs K-nearest matching techniques both from a source image to a target image and from the target image to the source image, employs symmetry matching, and employs random sample consensus techniques with a homography to locate shape descriptors in a target image that are similar to or match the shape descriptors in a source image. The design-aware image search system exploits these relationships to identify different products for inclusion in a search result. For instance, identified images may be associated with particular products, and the particular products may be included in a search result.

Continuing the above example with the patterned dress, for example, the design-aware image search system extracts the pattern from the dress, generates an edge image for the pattern, generates shape descriptors for features of the edge image, and searches a database for other images that match the shape descriptors. The design-aware image search system locates images that include objects other than the dress, each of which includes a similar or matching pattern to the one on the dress. For instance, the design-aware image search system locates different images depicting a tie, window curtains, artwork (digital or physical), a backpack, and so forth, each of which includes a pattern that is similar to or matching the pattern on the dress. Based on the located images, the design-aware image search system may locate products (e.g., a product page) corresponding to each of the located images, and include the products within a search result for output to the client device.

The described techniques thus remedy inefficiencies and resource wastage experienced in typical image search systems, while providing additional functionality not offered by typical image search systems. User devices resources are conserved since a user is initially presented with relevant search results. Thus, a user isn't forced to engage in a repeated manual viewing process through unfiltered images, which can unnecessarily burden device resources such as processor bandwidth and network bandwidth utilized to process and communicate such requests. For example, by reducing the excessive amount of user interaction required by manual viewing techniques, system resources such as data storage, memory, processor bandwidth, and network bandwidth used to store, process, and communicate digital images are conserved. Such resources are conserved, for example, since irrelevant images are not communicated to a user device or displayed on the user device.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Term Examples

Example descriptions or explanations of certain terms as used herein are set forth below. Each term is applicable to one or more, but not necessarily all, implementations that are presented herein. Some terms are further described using one or more examples.

"Digital visual content" or an "image" refers to any electronic media content that includes a visible creation such as a design or an electronic file that embodies the visible creation. Examples of digital visual content include digital graphics, digital images, digital images that include graphics, digital videos, and so forth. Examples of digital graphics include, but are not limited to, vector graphics, raster graphics (e.g., digital photographs), layouts having different types of graphics, and so forth.

An "object" in an image refers to a visual representation of a discrete physical object that is depicted within the image.

A "design" refers to any design, ornamentation, logo, emblem, trademark, symbol, sign, figure, insignia, marking, icon, pattern, motif, arrangement, composition, configuration, layout, formation, and so forth. A design may occur on an object, but may similarly exist outside of the object.

An "edge image" or "edge map" refers to an image representing points or lines corresponding to points in a source image where image features change sharply or have discontinuities. For example, sharp changes or discontinuities in brightness, depth, color, and so forth within a source image are detected and organized as points or lines in the corresponding edge image. Thus, an edge map indicates and represents edges within the source image.

A "shape descriptor" refers to shape representations of pixel configurations within image data. A shape descriptor may correspond to a block of pixels (e.g., a 5 pixel by 5 pixel block) and describes a shape found in a block of pixels within the image data. A shape descriptor may be a scale and/or rotation invariant shape representation. A shape descriptor may be associated with a particular or relative location with respect to other shape descriptors, such that a collection of shape descriptors describe an object or design within the image data.

Example Environment

Figure 1:
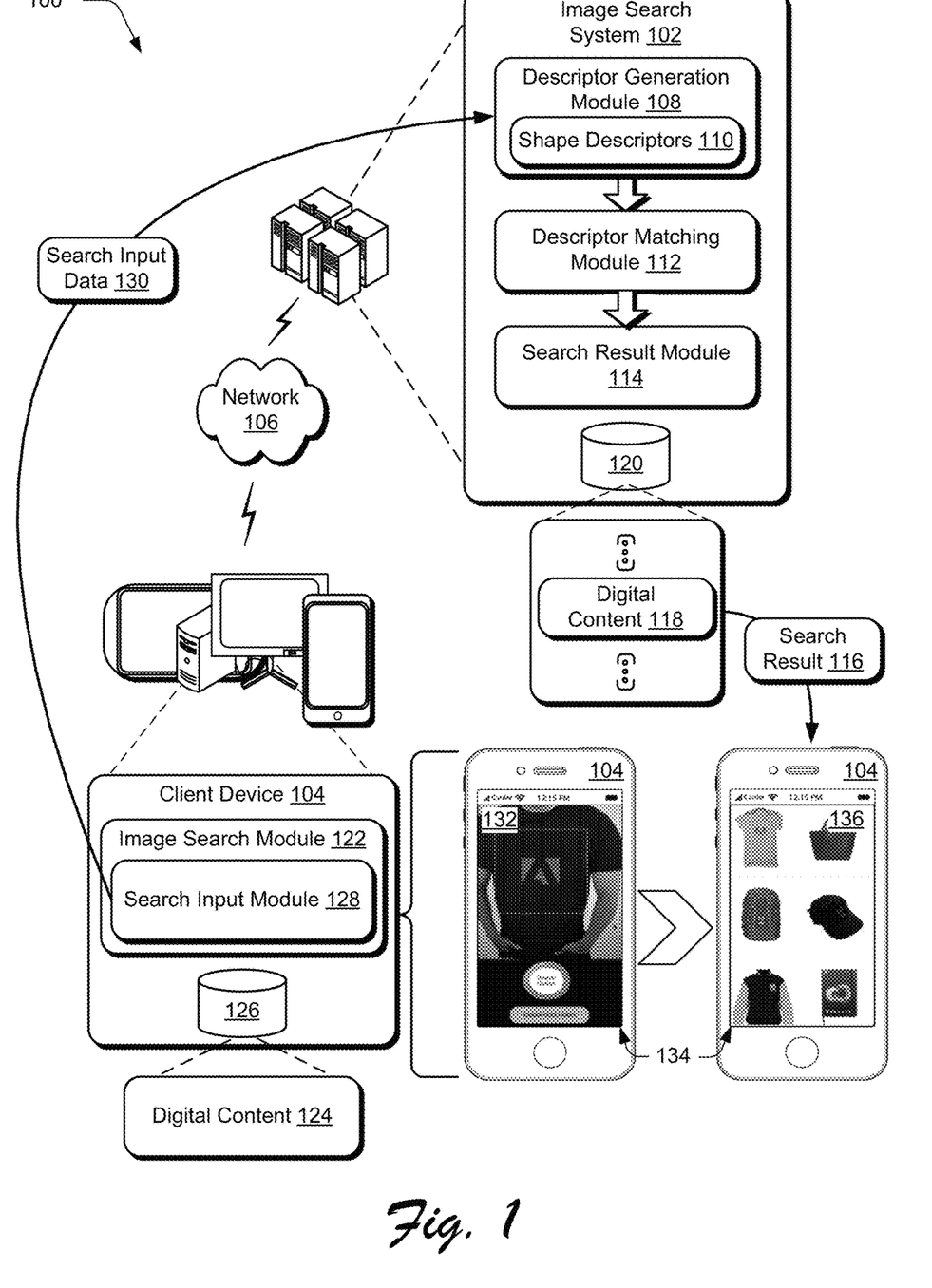
FIG. 1 is an illustration of an environment in an example implementation that is operable to employ design-aware image search techniques as described herein.

FIG. 1 is an illustration of a digital medium environment 100 in an example implementation that is operable to employ design-aware image search techniques in a digital medium environment as described herein. The illustrated environment 100 includes an image search system 102 and a plurality of client devices, an example of which is illustrated as client device 104. These devices are communicatively coupled, one to another, via a network 106 (e.g., the Internet) and computing devices that implement these systems and devices may assume a wide variety of configurations.

A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as shown for the image search system 102 and as further described in FIG. 7.

In at least some implementations, the image search system 102 includes a descriptor generation module 108 that is configured to process image data to create shape descriptors 110. The shape descriptors 110 are content-aware shape representations of designs or patterns within the image data, and may represent various features within a design or pattern. The image search system 102 additionally includes a descriptor matching module 112 that is configured to process shape descriptors 110 corresponding to different items of digital content and identify particular items of digital content that contain matching or similar designs or patterns. The descriptor matching module 112, for instance, is configured to identify corresponding features in the shape descriptors 110 for a pair of images and determine if the pair of images share a matching or similar design or pattern based on the corresponding features. Images with matching or similar designs or patterns are utilized by a search result module 114 of the image search system 102 for inclusion in a search result 116.

At least some of the digital content, relative to which the image search system 102 is configured to perform operations, is represented by the digital content 118. Although the digital content 118 is illustrated as being maintained in a storage device 120, the digital content 118 may also represent digital content accessible to the image search system 102 in other ways, e.g., accessible to the image search system 102 from storage of another device over the network 106.

In some implementations, the client device 104 includes an image search module 122 configured to support user interaction with digital content 124, which may be stored in a storage device 126. By way of example, the image search module 122 includes functionality to capture and/or edit visual content, such as digital graphics, digital images, digital images that include graphics, digital videos, and so forth. In at least some implementations, the digital content 124 includes a digital image or a digital video, and the image search module 122 is configured to view or edit digital images or video.

For instance, the image search module 122 may include a search input module 128 configured to enable a client device user to interact with application interfaces presented via the client device 104 to perform content capturing operations such as a user interface operable in conjunction with an image capture device of the client device 104 such as a digital camera. In some examples, the image capture device may be included as part of the client device 104 such as in examples in which the client device 104 is configured as a mobile device. In the illustrated example, the client device 104 is a mobile device (e.g., a smartphone) and the image capture device is a digital camera of the mobile device. In other examples, the image capture device may be communicatively coupled to the client device 104 via a wireless or a wired connection. The search input module 128 may further be configured to enable a client device user to interact with application interfaces presented via the client device 104 to perform content editing operations such as selecting portions of digital content, cropping digital content, and so forth.

The search input module 128 utilizes the digital content 124 to generate search input data 130 for use by the image search system 102 to generate the search result 116. The image search module 122 may facilitate other operations without departing from the spirit or scope of the techniques described herein. The image search module 122 may further be representative of more than one application (e.g., a suite of applications) that supports functionality to perform content editing operations on various types of digital content without departing from the spirit or scope of the techniques described herein.

The digital content 124 may represent various types of digital content without departing from the spirit or scope of the techniques described herein. The digital content 124 is depicted with digital photograph 132, for instance, which is also depicted being displayed via a display device 134 of the client device 104 at a first time. The display device 134 is also depicted displaying a search result 116 at a second time, which is after the first time, with various images 136. This represents a scenario in which the search input module 128 generates search input data 130 based on the digital photograph 132, which is communicated to the image search system 102 via the network 106 and processed by the image search system 102 to generate the search results 116, which are then communicated to the client device 104 via the network 106 and displayed on the display device 134 as the images 136. Although illustrated as implemented locally at the client device 104, functionality of the illustrated search input module 128 may also be implemented in whole or part via functionality available via the network 106, such as part of a web service or "in the cloud", by the image search system 102, and so forth. Similarly, although illustrated as implemented at the image search system 102, functionality of the image search system 102 may also be implemented in whole or part via functionality available at the client device 104, as part of a web service or "in the cloud", and so forth.

The image search system 102 is capable, in at least some implementations, of generating the search result 116 on the basis of designs or patterns without object or product based limitations. This contrasts with conventional approaches to image or product searching, which may utilize object-based techniques.

In implementations, the image search system 102 is part of or utilized by a product search system to effectuate product searches on the basis of an input image. For example, the digital content 118 includes products, product pages of a commerce platform, images of products, and so forth. In this example, the image search module 122 is utilized in conjunction with the product search system, e.g., as a mobile application configured to communicate with the product search system to receive product search inputs and output product search results. In such implementations, a user of the client device may input the digital photograph 132 that includes a design or pattern such that the user wishes to locate a product or various products that incorporate a similar or matching design or pattern. In this example, the search result 116 may include product search results including images of products, links to product pages, and so forth. For instance, the images 136 may be associated with functionality for viewing or purchasing products corresponding to each of the images.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
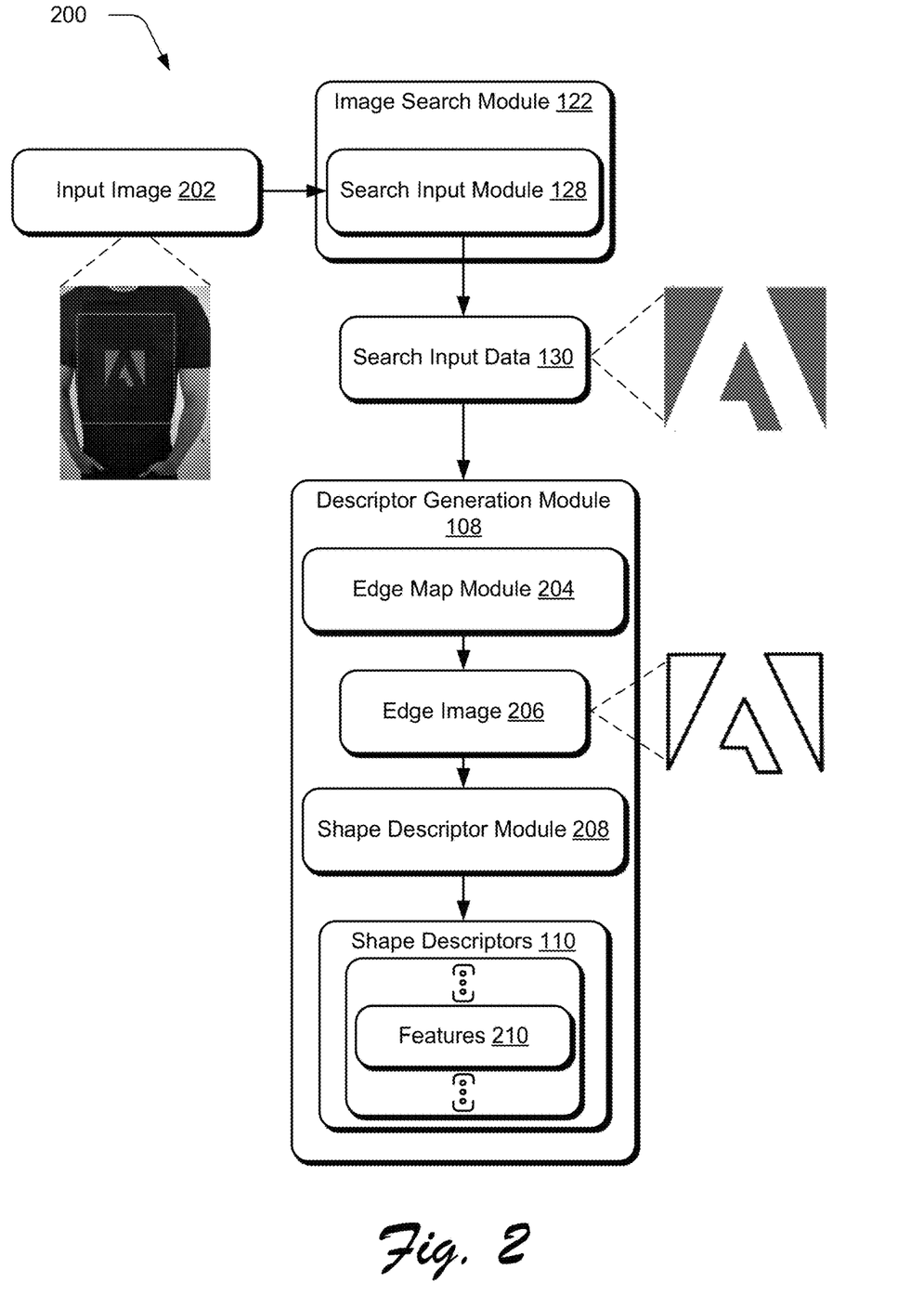
FIG. 2 depicts an example system showing a . . . processing pipeline of the image search system of FIG. 1 in greater detail.

FIG. 2 depicts a system 200 showing an example descriptor generation processing pipeline of the descriptor generation module 108 of FIG. 1 in greater detail to create the shape descriptors 110.

In at least some implementations, the descriptor generation processing pipeline begins with an input of the search input data 130. The search input data 130 may be received, for instance, from the image search module 122 of a client device 104. The search input module 128 of the image search module 122 may process the input image 202 to create the search input data 130 by editing or altering the input image 202, such as by cropping or resizing the image, adjusting parameters or the image or converting the image into grayscale, and so forth. For instance, the search input module 128 may provide user interface functionality for a user to identify a region within the input image 202 that includes a desired design or pattern, may apply machine learning techniques to identify a particular design or pattern within the input image 202, and so forth.

In other implementations, the descriptor generation processing pipeline begins with an input of the input image 202 directly, without having been processed by the search input module 128. For example, the input image 202 may be digital content 118 stored in the storage device 120 of the image search system 102.

In either case, the descriptor generation module 108 processes the input with an edge map module 204 to create an edge image 206. In implementations, the edge map module 204 utilizes an adapted Canny edge detector to create a map with lines and points representing edges. The input image is broken down into small image blocks, such as small blocks with specified pixel sizes (e.g., 12 pixel by 12 pixel blocks). Edge detection is performed in each respective block, ensuring that small or light edges are detected and not overlooked. The detected edges from the small image blocks may then be reconstituted as a single edge image 206. Adaptive hysteresis localization and thresholding is performed on the edge image 206 such that noise in the input image does not create false edges in the edge image 206, and edges that are marked in the edge image 206 align with the corresponding edges in the input image.

The edge image 206 is processed by a shape descriptor module 208 of the descriptor generation module 108 to create shape descriptors 110 that are content-aware shape representations configured to be compared with other shape representations for matching or similarity. The shape descriptors 110 may be configured as scale and rotation invariant shape representations.

For example, the shape descriptor module 208 utilizes oriented FAST and rotated BRIEF ("ORB") feature detection technique extended to represent the edges in the edge image 206 in a point neighborhood as a collection of small shape descriptors, or features 210. However, any suitable technique may be used to generate the features 210, such as a scale invariant feature transform ("SIFT") technique. A feature 210 may correspond to a small block of pixels, such as a 3 pixel by 3 pixel block or a 5 pixel by 5 pixel block, that is associated with a particular location or coordinate with respect to the edge image. Accordingly, a single design or pattern in the input image 202 may become associated with hundreds or thousands of features 210. The shape descriptor module 208 accumulates these features 210 along with the boundary/contour of the edge image 206 and represents this collection as the shape descriptors 110.

The shape descriptor module 208 may utilize a distortion threshold to allow for the shape descriptors 110 to represent small variations in designs or patterns. For instance, the shape descriptors 110 may be created as adaptive shape descriptors where each of the features 210 allows for a threshold distortion (e.g., 15% distortion).

Figure 3:
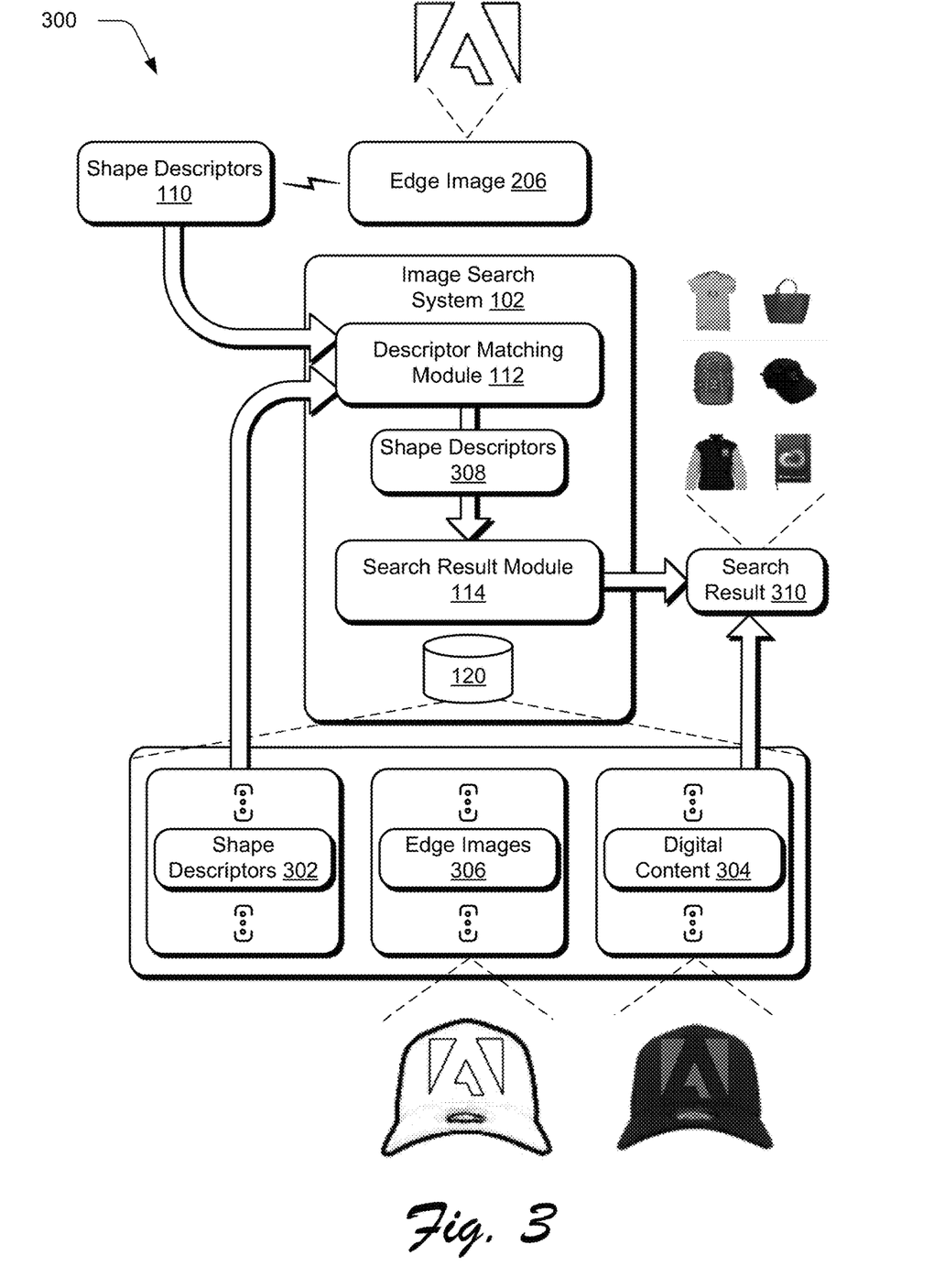
FIG. 3 depicts an example system showing a . . . processing pipeline of the image search system of FIG. 1 in greater detail.

FIG. 3 depicts a system 300 showing an example descriptor matching and search result processing pipeline of the image search system 102 of FIG. 1 in greater detail to generate search results based on shape descriptors.

The descriptor matching module 112 receives shape descriptors corresponding to an input image, such as the shape descriptors 110 corresponding to the edge image 206 as described above with respect to FIG. 2. The descriptor matching module 112 further receives shape descriptors 302 corresponding to digital content 304. As an example, the image search system 102 may be implemented as part of a product search system, a commerce or e-commerce platform, an inventory management system, and so forth. In this example, the items of digital content 304 correspond to products available for purchase, including images portraying the products. The various items of digital content 304 (e.g., the images corresponding to the various products available for purchase) are processed by the descriptor generation module 108 as described above with respect to FIG. 2, such that the image search system 102 has generated or stored edge images 306 and/or the shape descriptors 302 corresponding to each respective item of digital content 304. In some implementations, the edge images 306 and the shape descriptors 302 are pre-generated and stored prior to receipt of a search request corresponding to the shape descriptors 110.

The descriptor matching module 112 is configured to match the features of the shape descriptors 110 with features of the shape descriptors 302. The features of the shape descriptors 110 (e.g., features of a 'source' image) are defined as S(d), while the features of respective shape descripts 302 (e.g., features of respective 'target' images) are defined as T(d). The descriptor matching module 112 performs a K-nearest matching technique on S(d)->T(d) with at least two neighbors. The resultant matches are defined as the set $R_{source}$. The descriptor matching module 112 further performs a K-nearest matching technique on T(d)->S(d) with at least two neighbors. The resultant matches are defined as the set $R_{target}$. For example, the descriptor matching module 112 may utilize Hu image moments as part of the matching techniques, which are centrals moments that are translation, scale, and rotation invariant The descriptor matching module 112 subjects the sets $R_{source}$ and $R_{target}$ to a ratio test to reduce false positives and increase the accuracy of probable matches, and the resultant matches of the ratio test are defined as the set $R_{ratio}$.

The descriptor matching module performs symmetry matching on $R_{ratio}$ to further refine the results to robust matches with a high probability of matching, resulting in a set of features $R_{symmetry}$. For the features included in $R_{symmetry}$, a homography Hk is generated from S(d) to T(d) for each object match in the target image. Random sample consensus (RANSAC) techniques are performed with the homography Hk to confirm accurate matches and remove outlier features. Accordingly, the descriptor matching module 112 locates shape descriptors 308 from among the shape descriptors 302 that are similar to or match the shape descriptors 110, and communicates the located shape descriptors 308 to the search result module 114.

The descriptor matching module 112 may utilize an adaptive matching technique to select exact matches or similar matches based on an input criteria. For instance, the descriptor matching module 112 may utilize a distortion threshold with respect to the shape descriptors. As an example, the image search module 122 of the client device 104 may be configured to present a user interface instrumentality allowing a user of the client device to select between an exact search or a similar search, may allow different values to be selected for a degree of matching (e.g., via slider inputs, drop-down menus, text inputs, and so forth). In implementations, a search for an exact match may allow for some amount of distortion (e.g., a threshold for distortion in shape-descriptors of less than 10%), while a search for a similar match allows for a greater amount of distortion. The descriptor matching module 112 may apply the threshold amount of distortion in various ways. For instance, the threshold amount of distortion may be used in determining a ratio for the ratio test used to determine the set $R_{ratio}$, may be used in determining a size for the features 210 generated by the shape descriptor module 208 (e.g., determining features with a size of 3×3 pixels or a size of 10×10 pixels based on the amount of distortion), and so forth.

The search result module 114 identifies items of the digital content 304 corresponding to the shape descriptors 308. For instance, the digital content 304 is stored in the storage device 120 along with the corresponding shape descriptors 302 such that a particular item of the digital content 304 may be located based on its corresponding shape descriptor 302. Thus, the shape descriptors 308 are usable to locate the corresponding digital content 304 within the storage device 120. The search result module 114 generates a search result 310 that includes at least one of the located items of digital content 304. In implementations, the search result 310 is output to a client device, such as via the network 106. In some implementations, the search result 310 contains the items of digital content 304 for which the edge images 306 were generate. In some implementations, the search result 310 may contain links to the digital content 304, products associated with the digital content 304, and so forth. For example, the search result 310 may include an image of a product which was used to generate the corresponding edge image 306, and the image is associated with a link to a product page within an e-commerce platform that corresponds to the image and contains additional information pertaining to the product.

In implementations where the search result 310 contains products, the search result module 114 locates the products based on the digital content 304 associated with the shape descriptors 308. For instance, the image search system may have located or generated the digital content 304 by extracting images from a product page. Thus, while the edges images and shape descriptors describe the images in the digital content 304, they additionally correspond to additional information or objects, such as information identifying the product corresponding to the image (e.g., a URL or QR code for a product page associated with the image, a UPC or barcode used to identify the product, and so forth). In this manner, an identification of an image corresponding to a product serves to identify the product as well. The search result module 114 leverages this association when generating the search result 310. For instance, while the located digital content 304 may include an image, the search result module 114 may identify the product associated with the image and generate a search result 310 that incorporates images of the product (e.g., the image included in the digital content 304 and/or other images associated with the product) along with a link to the product page, may incorporate other representations of the product, and so forth. In this manner, design-aware image search techniques may be utilized to locate products on the basis of an input design or pattern.

Figure 4:
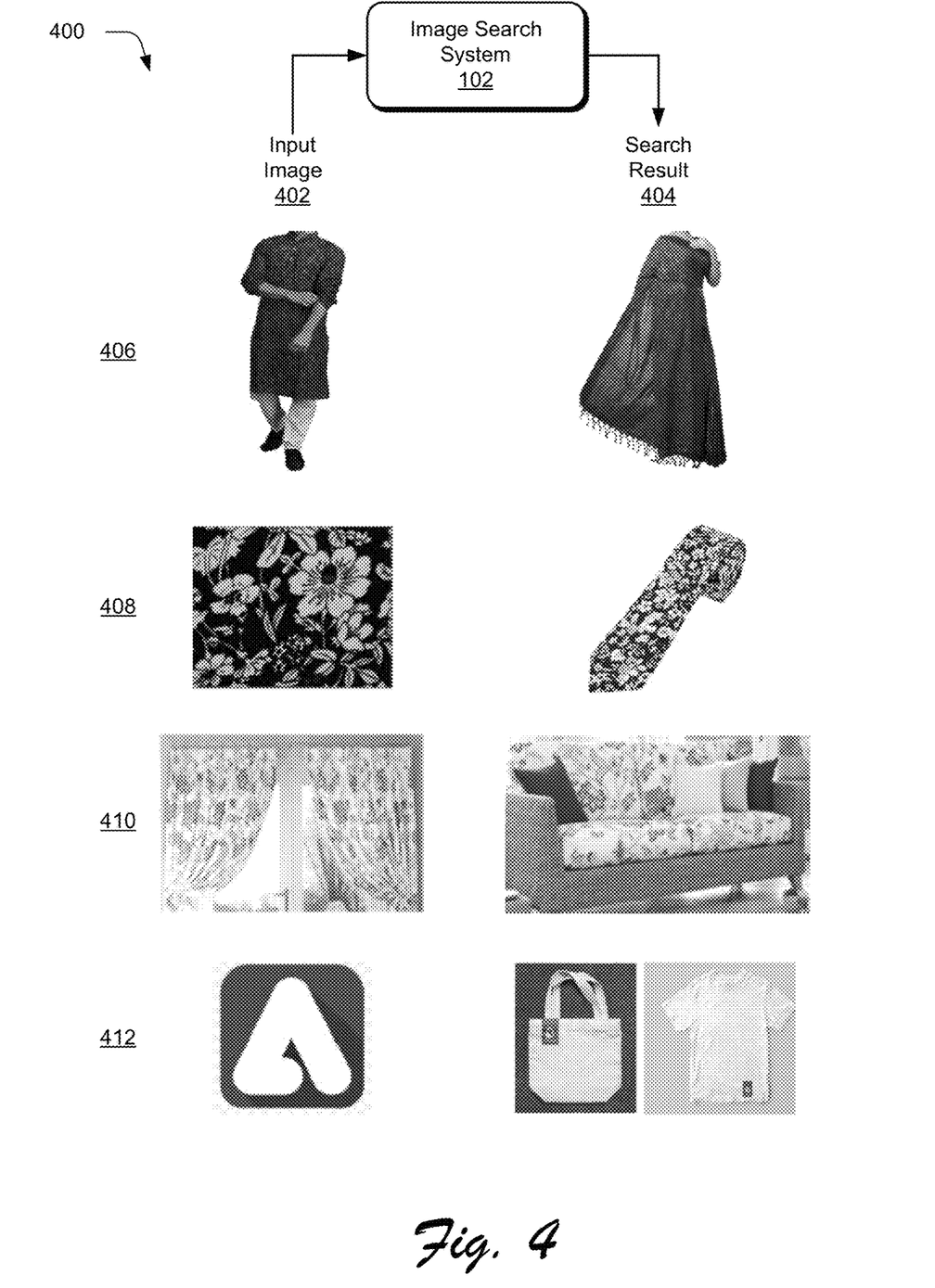
FIG. 4 depicts examples of design-aware search techniques as implemented by the image search system of FIG. 1.

FIG. 4 further illustrates example images 400 of a design-aware image search as implemented by the image search system 102 of FIG. 1. In these illustrated examples, the image search system 102 receives an input image 402 that a user wants to use in searching for similar designs or patterns through a design-aware image search.

In at least some implementations, the image search system 102 generates a search result 404 based on the input image 402, as generally described with reference to FIGS. 1-3. For example, the image search system 102 processes the input image 402 with the descriptor generation module 108 to create the shape descriptors 110, and further processes the shape descriptors 110 with the descriptor matching module 112 to locate similar or matching images for use in creating the search result 404 with the search result module 114. Four different examples of a respective input image 402 and search result 404 are shown across four rows in the illustrated example images 400.

In a first row 406 of the example images 400, the input image 402 includes a man wearing a patterned kurta that has been purchased for a themed marriage function. The man wishes to purchase a saree for his wife that includes a similar or matching pattern with respect to the patterned kurta. Accordingly, the man has input a picture of his patterned kurta for use by the image search system 102, and the image search system 102 has performed design-aware image search techniques as described above to locate product images that incorporate a pattern similar to the pattern found on the patterned kurta. The image search system 102 outputs the search result 404, which includes a patterned saree having a pattern similar to the pattern of the kurta.

In a second row 408 of the example images 400, the input image 402 includes a floral pattern, and no particular object aside from the floral pattern is discernable. In this scenario, a woman owns a dress with the floral pattern and wishes to locate a tie for her husband that has a similar or matching floral pattern. The woman utilizes the image search system 102 to perform a design-aware image search as described above with respect to a portion of the floral pattern on her dress, and receives the search result 404 which includes a patterned tie having a pattern similar to the pattern of the input floral pattern corresponding to the dress.

In a third row 410 of the example images 400, the input image 402 includes patterned curtains hanging in front of a window. A user is searching for home decor that would match the patterned curtains, and has used a mobile device to capture the input image 402 and upload the input image 402 to the image search system 102. The image search system 102 has performs a design-aware image search technique as described above to locate various home decor items with a pattern similar to the pattern found on the curtains. The image search system 102 outputs the located home decor items as the search result 404, which includes a patterned sofa with a pattern similar to the pattern of the curtains.

In a fourth row 412 of the example images 400, the input image 402 includes a logo design. A user has searched for products containing the logo design, and the image search system 102 has located various products incorporating the product design. As the image search system 102 utilizes design-aware image search techniques that are not limited by object or product types, the image search system 102 locates products of different and various types or objects, such as a tote bag incorporating the input design and a t-shirt incorporate the input design as part of the search result 404.

Example Procedures

The following discussion describes techniques that may be implemented utilizing the previously described systems and devices. Aspects of the procedures may be implemented in hardware, firmware, software, or a combination thereof. The procedures are shown as sets of blocks that specify operations performed by one or more devices and are not necessarily limited to the orders shown for performing the operations by the respective blocks. In portions of the following discussion, reference will be made to FIGS. 1-4.

Figure 5:
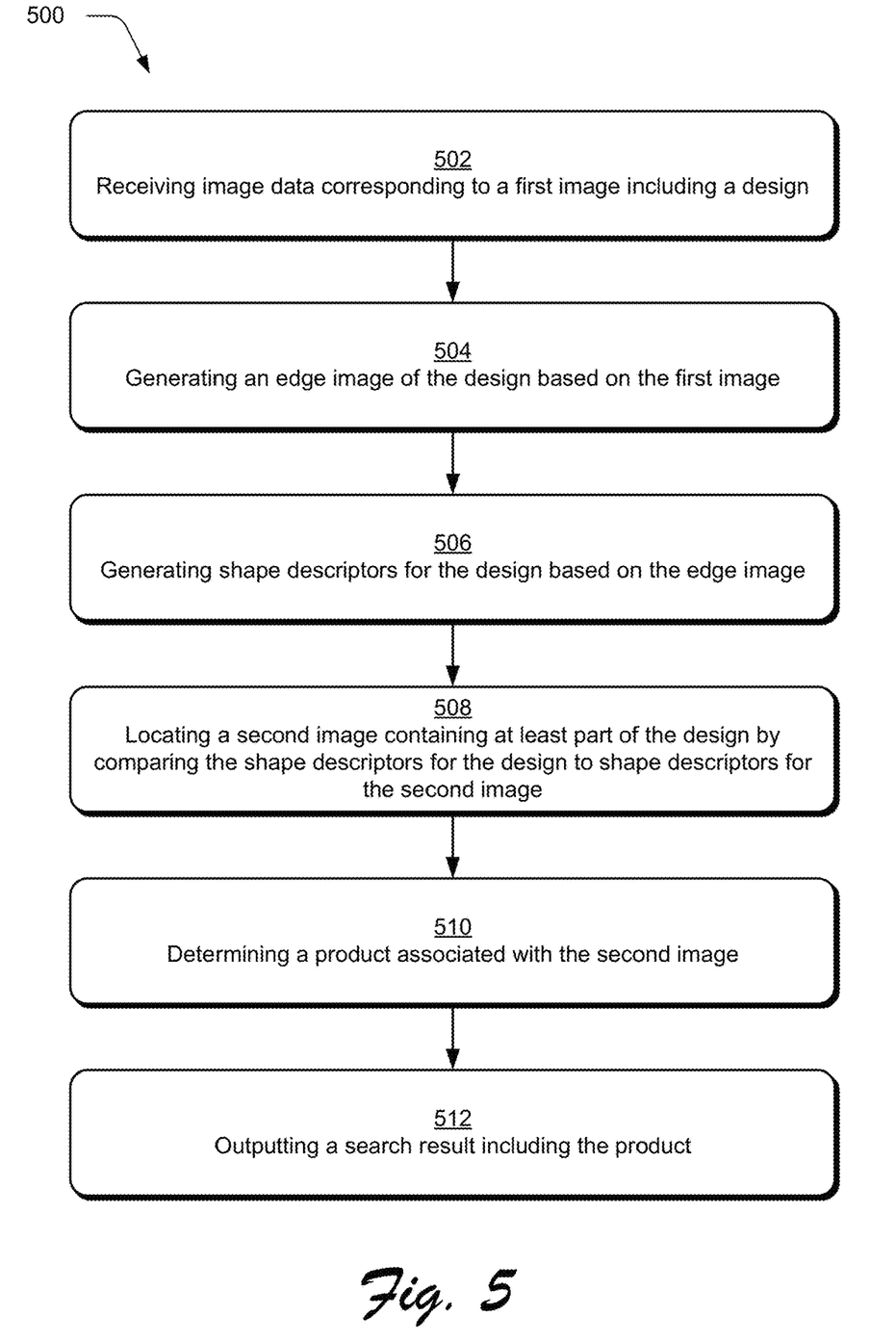
FIG. 5 is a flow diagram depicting a procedure in an example implementation of design-aware image search techniques.

FIG. 5 depicts a procedure 500 in an example implementation of design-aware image search techniques. Image data is received corresponding to a first image including a design (block 502). For example, the client device or the image search system 102 may receive captured image data from an image capture device, may receive the image data via the network 106, may locate the image data from among a set of images, and so forth. The image includes a design, such as a pattern, logo, icon, graphic, and so forth. The search input module 128 may be configured, for instance, to identify the design within the image automatically or to provide a selectable indication for detected objects within the image for selection by a user.

An edge image of the design is generated based on the first image (block 504). For example, the edge map module 204 of FIG. 2 may be implemented to apply an adapted Canny edge detector on the input image data to create a map with lines and points representing edges. The image data may be fragmented into constituent blocks, with edge detection performed in each respective block, and the plurality of constituent edge images reconstituted into a single edge image for the image data. Shape descriptors for the design are generated based on the edge image (block 506). For instance, ORB or SIFT techniques as described with respect to FIG. 2 may be employed to generate features corresponding to particular locations within the edge image. For instance, each feature may correspond to a small block of pixels, such as a 3×3 pixel or 5×5 pixel block associated with a particular location in the edge image.

A second image containing at least part of the design is located by comparing the shape descriptors for the design to shape descriptors for the second image (block 508). For example, the descriptor matching module 112 as described with respect to FIG. 2 may perform a K-nearest matching technique on features of the source image with respect to features of the target image, perform a K-nearest matching technique on features of the target image with respect to features of the source image, and perform a ratio test on the resultant sets of the two K-nearest matching techniques in order to reduce false positives and increase the accuracy of probable matches. Further, the ratio test may be implemented to incorporate an allowable threshold of distortion allowed during matching, allowing for different 'strengths' of matching (e.g., an exact match, a closely-similar match, a loosely-similar match, and so forth). These results may be further refined to confirm accurate matches and remove outliers by performing symmetry matching, and generating a homography for each object match in the target image for use with random sample consensus techniques.

A product associated with the second image is determined (block 510). For instance, the second image depicts the product, is found on a product page of an e-commerce platform corresponding to the product, or is otherwise associated with the product. A search result including the product is output (block 512). In implementations, a search result is generated that incorporates the second image, another image of the product, a link to a product page for the product, additional information about the product, or so forth. The search result may be displayed in a user interface, may be output in conjunction with an application to effect image or product searches, may be stored in a hardware device, and so forth.

Figure 6:
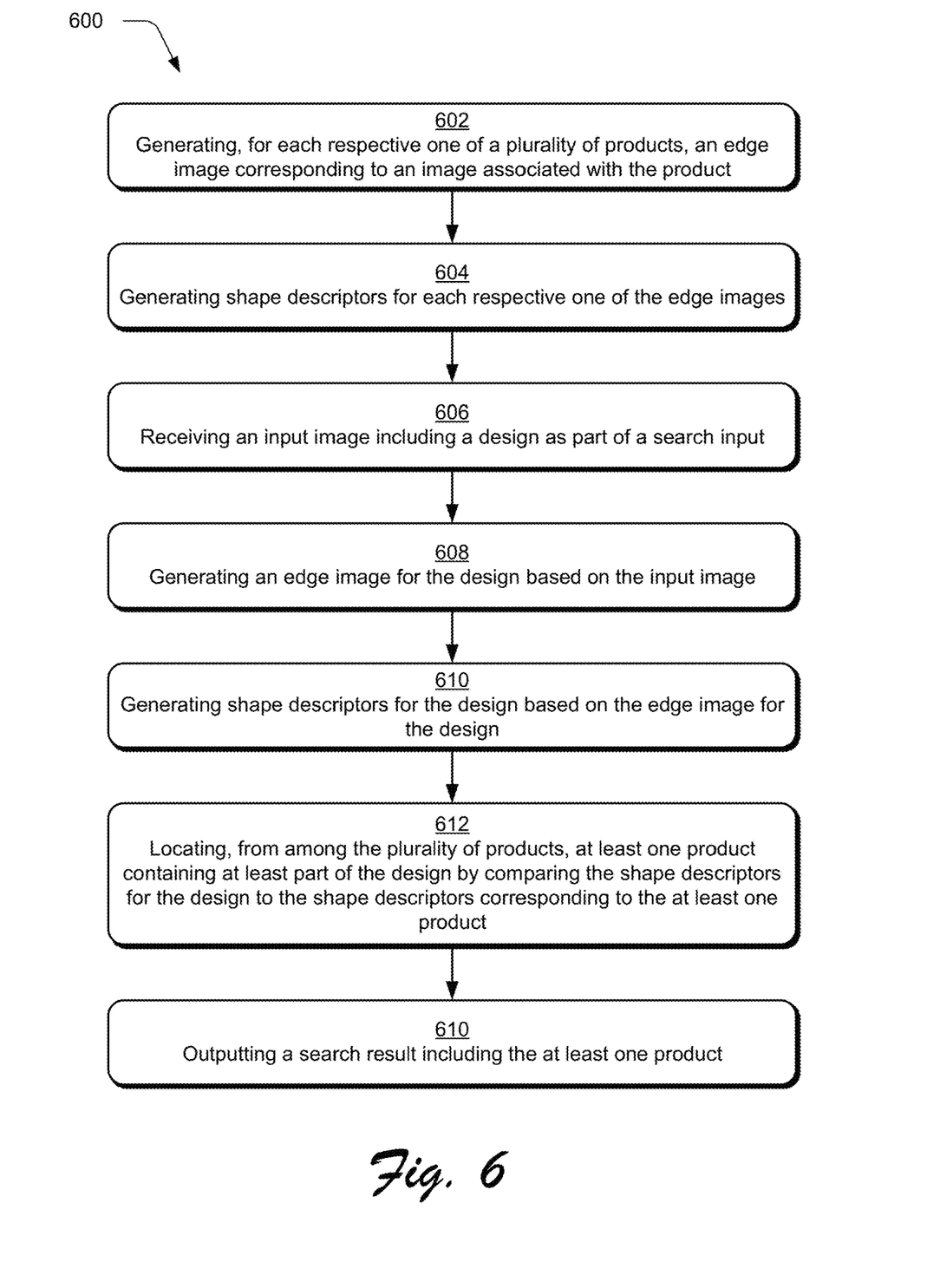
FIG. 6 is a flow diagram depicting a procedure in an example implementation of design-aware image search techniques.

FIG. 6 depicts a procedure 600 in an example implementation of design-aware image search techniques. An edge image is generated, for each respective one of a plurality of products, corresponding to an image associated with the product (block 602). This may be performed for each respective one of the plurality of products, for instance, by the edge map module 204 of FIG. 2 or as described with respect to block 504 of FIG. 5. As an example, the design-aware image search techniques are implemented by an e-commerce platform hosting content pertaining to a plurality of different products, and may include a product page corresponding to each of the different products. The image search system 102 may extract images from the product pages that depict the respective products, and perform edge mapping techniques on each of these extracted images.

Shape descriptors are generated for each respective one of the edge images (block 604). This may be performed for each respective edge image, for instance, by the shape descriptor module 208 of FIG. 2 or as described with respect to block 506 of FIG. 5. These shape descriptors may be pre-computed and stored in a storage device of the image search system 102, such that shape descriptors are stored corresponding to different respective products hosted by the e-commerce platform.

An input image including a design is received as part of a search input (block 606). For example, the image search system 102 receives a search input from a client device, and the search input includes an input image having a design, pattern, logo, icon, graphic, or so forth. An edge image for the design is generated based on the input image (block 608). This may be performed, for instance, by the edge map module 204 of FIG. 2 or as described with respect to block 504 of FIG. 5. Shape descriptors for the design are generated based on the edge image for the design (block 610). This may be performed, for instance, by the shape descriptor module 208 of FIG. 2 or as described with respect to block 506 of FIG. 5.

At least one product is located from among the plurality of products as containing at least part of the design, by comparing the shape descriptors for the design to the shape descriptors corresponding to the at least one product (block 612). For example, the descriptor matching module 112 as described with respect to FIG. 2 may perform a K-nearest matching technique on features of the source image with respect to features of the target image, perform a K-nearest matching technique on features of the target image with respect to features of the source image, and perform a ratio test on the resultant sets of the two K-nearest matching techniques in order to reduce false positives and increase the accuracy of probable matches. Further, the ratio test may be implemented to incorporate an allowable threshold of distortion allowed during matching, allowing for different 'strengths' of matching (e.g., an exact match, a closely-similar match, a loosely-similar match, and so forth). These results may be further refined to confirm accurate matches and remove outliers by performing symmetry matching, and generating a homography for each object match in the target image for use with random sample consensus techniques. Upon identifying a matching image based on the shape descriptors, the image search system 102 locates a product corresponding to the image.

A search result is output that includes the at least one product (block 610). In implementations, a search result is generated that incorporates one or more of the located products, an image of a product, a link to a product page for a product, additional information about a product, or so forth. The search result may be displayed in a user interface, may be output in conjunction with an application to effect image or product searches, may be stored in a hardware device, and so forth.

Having discussed some example procedures, consider now a discussion of an example system and device in accordance with one or more implementations.

Example System and Device

Figure 7:
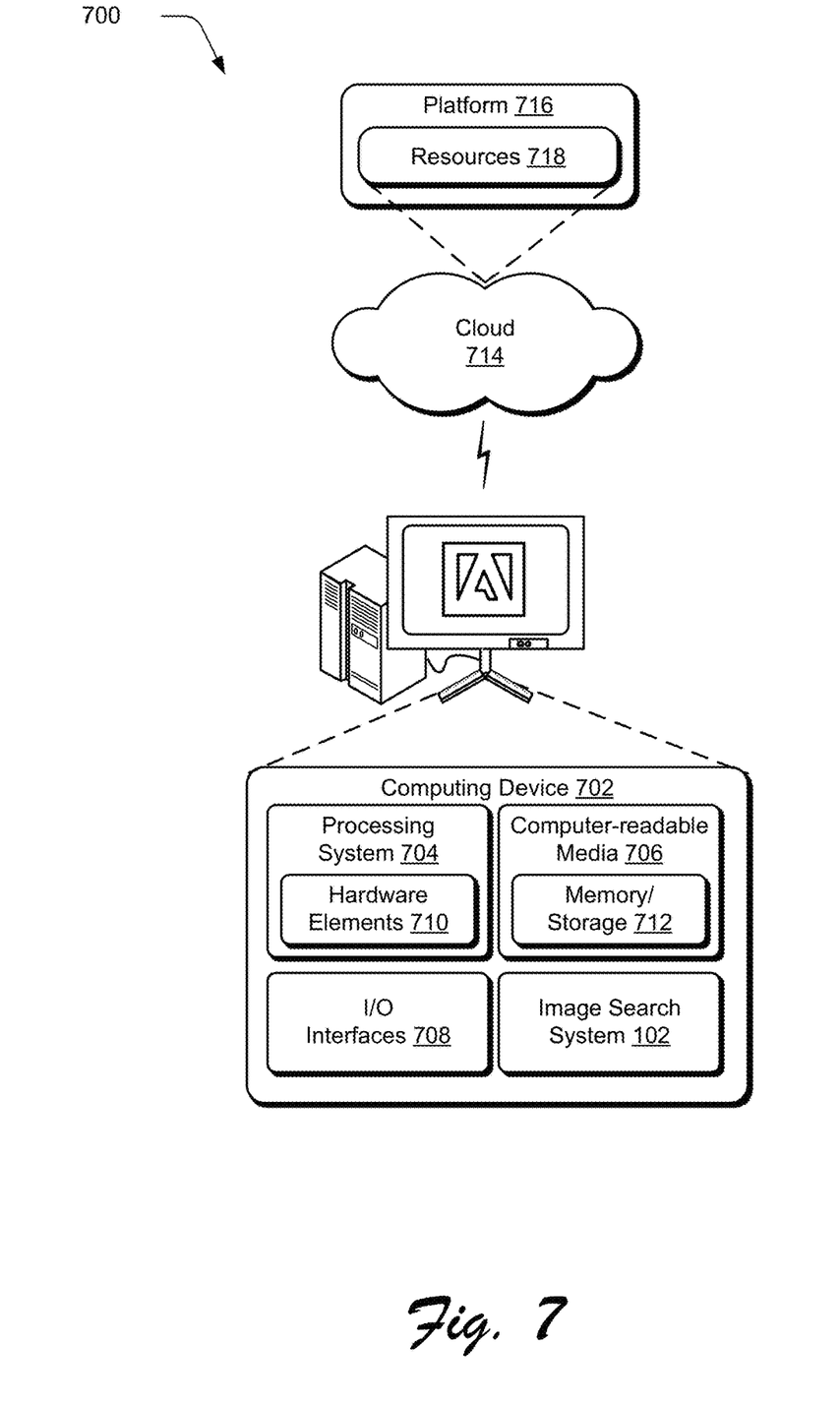
FIG. 7 illustrates an example system including various components of an example device that can be implemented as any type of computing device as described and/or utilized with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the image search system 102. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
one or more processors; and
a memory storing instructions that are executable by the one or more processors to:
generate, for each respective one of a plurality of indications of products, an edge image corresponding to an image associated with each one of the plurality of the indications of the products using a machine learning model to detect a feature depicted in the image, the edge image including lines identifying edges of the feature;
generate shape descriptors describing one or more pixel configurations or vector configurations for each respective one of the edge images;
receive, from a client device and via a network, an input image including a design as part of a search input;
generate an edge image for the design based on the input image using the machine learning model;
generate shape descriptors for the design based on the edge image for the design;
locate, from among the plurality of indications of the products, at least one indication of a product containing a feature including at least part of the design by comparing the shape descriptors for the design to the shape descriptors corresponding to the at least one indication of the product; and
output, to the client device and via the network, a search result including the at least one product.

2. The system of claim 1, wherein the instructions are further executable by the one or more processors to receive, as part of the search input, an indication of a region of the input image that includes the design.

3. The system of claim 2, wherein the instructions are further executable by the one or more processors to generate a grayscale image for the region, and wherein to generate the edge image for the design is based on the grayscale image.

4. The system of claim 1, wherein to generate the edge image for the design includes to fragment the input image into a plurality of blocks and perform an edge detection technique on each respective block of the plurality of blocks.

5. The system of claim 1, wherein to compare the shape descriptors is based in part on a threshold amount of distortion between the shape descriptors.

6. The system of claim 5, wherein the instructions are further executable by the one or more processors to receive, as part of the search input, a value for the threshold amount of distortion.

7. The system of claim 1, wherein the instructions are further executable by the one or more processors to receive an input to filter the search result.

8. A method comprising:
generating, for each respective one of a plurality of indications of products, an edge image corresponding to an image associated with each one of the plurality of the indications of the products using a machine learning model to detect a feature depicted in the image, the edge image including lines identifying edges of the feature;
generating shape descriptors describing one or more pixel configurations or vector configurations for each respective one of the edge images;
receiving, from a client device and via a network, an input image including a design as part of a search input;
generating an edge image for the design based on the input image using the machine learning model;
generating shape descriptors for the design based on the edge image for the design;
locating, from among the plurality of indications of the products, at least one indication of a product containing a feature including at least part of the design by comparing the shape descriptors for the design to the shape descriptors corresponding to the at least one indication of the product; and
outputting, to the client device and via the network, a search result including the at least one product.

9. The method of claim 8, further comprising receiving, as part of the search input, an indication of a region of the input image that includes the design.

10. The method of claim 9, further comprising generating a grayscale image for the region, and wherein the generating the edge image for the design is based on the grayscale image.

11. The method of claim 8, wherein the generating the edge image for the design includes fragmenting the input image into a plurality of blocks and performing an edge detection technique on each respective block of the plurality of blocks.

12. The method of claim 8, wherein the comparing the shape descriptors is based in part on a threshold amount of distortion between the shape descriptors.

13. The method of claim 12, further comprising receiving, as part of the search input, a value for the threshold amount of distortion.

14. The method of claim 8, further comprising receiving an input to filter the search result.

15. A system comprising:
means for generating, for each respective one of a plurality of indications of products, an edge image corresponding to an image associated with each one of the plurality of the indications of the products using a machine learning model to detect a feature depicted in the image, the edge image including lines identifying edges of the feature;
means for generating shape descriptors describing one or more pixel configurations or vector configurations for each respective one of the edge images;
means for receiving, from a client device and via a network, an input image including a design as part of a search input;
means for generating an edge image for the design based on the input image using the machine learning model;
means for generating shape descriptors for the design based on the edge image for the design;
means for locating, from among the plurality of indications of the products, at least one indication of a product containing a feature including at least part of the design by comparing the shape descriptors for the design to the shape descriptors corresponding to the at least one indication of the product; and
means for outputting, to the client device and via the network, a search result including the at least one product.

16. The system of claim 15, further comprising means for receiving, as part of the search input, an indication of a region of the input image that includes the design.

17. The system of claim 16, further comprising means for generating a grayscale image for the region, and wherein the generating the edge image for the design is based on the grayscale image.

18. The system of claim 15, wherein the generating the edge image for the design includes fragmenting the input image into a plurality of blocks and performing an edge detection technique on each respective block of the plurality of blocks.

19. The system of claim 15, wherein the comparing the shape descriptors is based in part on a threshold amount of distortion between the shape descriptors.

20. The system of claim 19, further comprising means for receiving, as part of the search input, a value for the threshold amount of distortion.

* * * * *